United States Patent
Logvinov et al.

(10) Patent No.: US 8,539,105 B2
(45) Date of Patent: Sep. 17, 2013

(54) SYSTEM AND METHOD FOR SYNCHRONIZED CONTENT RENDERING IN A MULTI-NODE NETWORK

(75) Inventors: Oleg Logvinov, Piscataway, NJ (US); Michael Macaluso, Jackson, NJ (US)

(73) Assignee: STMicroelectronics, Inc., Coppell, TX (US)

( * ) Notice: Subject to any disclaimer, the term of this patent is extended or adjusted under 35 U.S.C. 154(b) by 262 days.

(21) Appl. No.: 12/928,218

(22) Filed: Dec. 6, 2010

(65) Prior Publication Data

US 2012/0038826 A1 Feb. 16, 2012

Related U.S. Application Data

(63) Continuation-in-part of application No. 11/810,460, filed on Jun. 5, 2007, now abandoned.

(60) Provisional application No. 60/811,177, filed on Jun. 5, 2006.

(51) Int. Cl.
*G06F 15/16* (2006.01)

(52) U.S. Cl.
USPC ............. 709/248; 709/204; 709/231; 725/32; 725/89; 725/90; 725/135; 370/210; 370/356; 370/401

(58) Field of Classification Search
USPC ................ 709/204, 231, 248; 725/32, 89, 725/90, 135; 370/210, 356, 401
See application file for complete search history.

(56) References Cited

U.S. PATENT DOCUMENTS

| | | | |
|---|---|---|---|
| 6,233,235 B1* | 5/2001 | Burke et al. | 370/356 |
| 2002/0059575 A1* | 5/2002 | Watts et al. | 725/1 |
| 2005/0036512 A1* | 2/2005 | Loukianov | 370/469 |
| 2006/0072399 A1* | 4/2006 | Fujimoto et al. | 369/47.1 |
| 2006/0098570 A1* | 5/2006 | Hadad | 370/210 |
| 2006/0156375 A1* | 7/2006 | Konetski | 725/135 |
| 2006/0177200 A1* | 8/2006 | Deutmeyer et al. | 386/98 |
| 2007/0276670 A1* | 11/2007 | Pearlstein | 704/270 |

* cited by examiner

*Primary Examiner* — Wing F Chan
*Assistant Examiner* — Hitesh Patel
(74) *Attorney, Agent, or Firm* — Slater & Matsil, L.L.P.

(57) ABSTRACT

The trend toward moving to digital content is progressing and expanding every day. With that trend comes the availability of a multitude of content from many content sources. There is a need for this content to be distributed to multiple destinations, and there is a further need to have the content synchronized among those multiple destinations. Embodiments described herein detail a method of synchronizing this content in an asynchronous environment, such as a powerline network, including using a PHY timing flag that is used to compensate for PHY-to-channel-to-PHY delays.

20 Claims, 1 Drawing Sheet

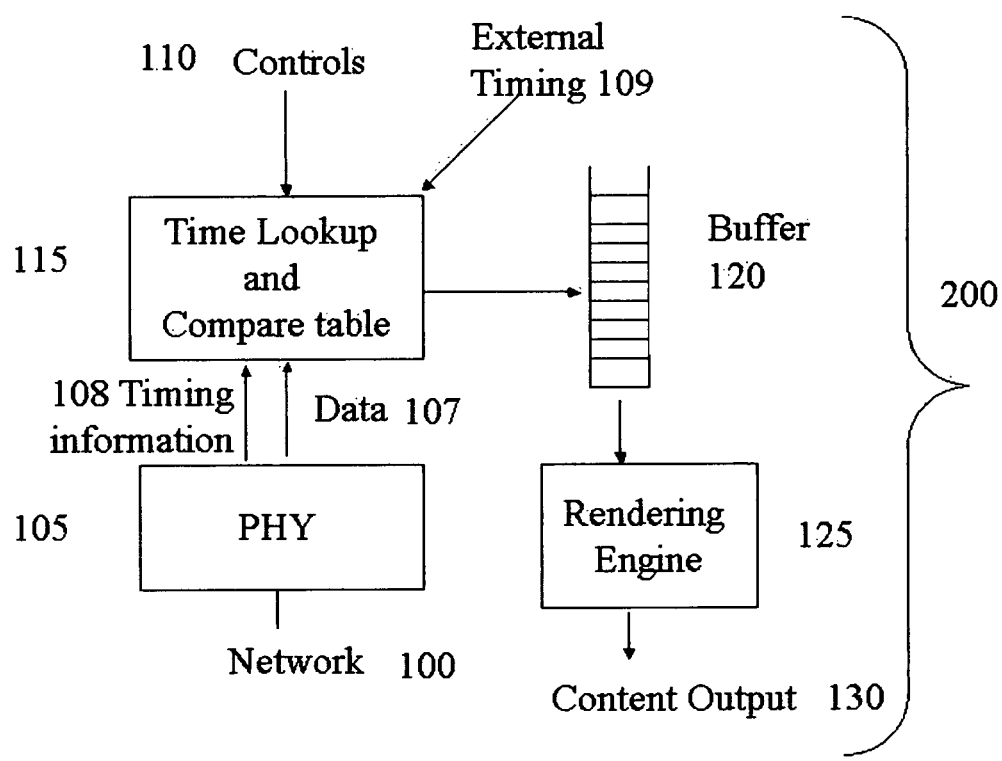

SYSTEM AND METHOD FOR SYNCHRONIZED CONTENT RENDERING IN A MULTI-NODE NETWORK

This continuation in part application claims priority to U.S. Provisional Patent Application No. 60/811,177, filed Jun. 5, 2006, and Utility patent application Ser. No. 11/810,460 filed Jun. 5, 2007, which are hereby incorporated by reference herein in their entirety.

FIELD OF THE INVENTION

Embodiments of this invention relates generally to the distribution and playback synchronization of content, such as audio, video or other data, over conventional mediums, such as cable, DSL, wireless, or powerline (electric power conveying media used also as a local communications network media), and more particularly, to utilizing one or a combination of these networks to create a content distribution system that may be synchronized based on user response and interaction resulting from the content rendering. Embodiments of the invention have uses on any network or combination of networks used for content distribution.

BACKGROUND OF THE INVENTION

Multimedia distribution is experiencing a shift from old-fashioned analog signals into a digital distribution. In the recently released report titled "Media Networking 2005: The Networked Living Room Becomes a Reality", InStat cites the following important trend. Total media networking connections in homes will grow from over 50 million in 2005 to over 200 million in 2009, a 29% compound annual growth rate. This shift creates a demand for new products, and new products demand new types of semiconductors that incorporate digital technologies supporting such functions as communications and media rendering.

These statements all point to a continuing shift to digital content. More specifically, these trends also point to the growing need for, and continuing proliferation of, digital content sources, digital content distribution networks and mediums, and digital content rendering devices such as digital music players, smart phones, or other Internet appliances. With the basic concept of content distribution in place, embodiments of this invention detail a method and system whereby content can be rendered in a synchronized manner. When content is distributed to multiple destinations, or when different sources, or types of content, (such as audio and video) are distributed to a destination (node), there is a need to keep the content synchronized. For example, if audio content is distributed to multiple rooms, the streams need to be in sync to create a good listener experience, or a video and audio stream going to the same destination needs to be in sync for the proper output to be seen and heard (for example to preserve lipsync). Even more difficult is the case where the audio content may go to one node and the matching video to another, and where content may come from different sources. In these cases, master network clocks and time stamps are insufficient to accommodate all the timing variations in the system. Therefore there exists a need to have a method and system that allows for synchronized content rendering in a multi-node powerline environment.

SUMMARY OF EMBODIMENTS OF THE INVENTION

Embodiments of this invention relate to a content distribution network for homes, businesses, apartment complexes, and other residential buildings, where streaming audio and multimedia content is sourced/originated, captured, stored, transmitted, received, and rendered through a number of devices located throughout the network. Embodiments of the invention are described for operation on an electrical power distribution network; however, these concepts and methods can be applied to any network, wired or wireless, or a combination of networks where one of these networks may be a powerline communications (PLC) network. Embodiments of this invention detail a method of synchronizing audio, and other digital content, in an asynchronous network, such as a PLC network. The preferred embodiment described here relates to a local area or wide area broadband power line communications network, wherein there are multiple nodes that have the ability to source, distribute, or render the multimedia content. The major benefits of embodiments of the invention are to provide precise time synchronization among ALL content rendering nodes on the network, and provide the ability to use long buffers on the receiver side of the network nodes.

BRIEF DESCRIPTION OF THE DRAWING

Embodiments of the present invention will be subsequently described further with reference to the accompanying diagram in which:

FIG. 1 shows a diagram of the functional blocks of a networked communications device that has synchronization functionality added.

100 Network and network interface
    105 PHY (pHYsical Layer) which connects the apparatus to the network
    107 Data recovered from the network
    108 Timing information recovered from the Data
    109 External timing sync signal
    110 Control signals that control the buffer and lookup table logic
    115 Lookup table and compare logic
    120 Buffer, which is digital memory
    125 Rendering engine that converts digital content data to analog output
    130 Analog content output such as audio or video
    200 The apparatus that contains the synchronization functionality

DETAILED DESCRIPTION OF EMBODIMENTS OF THE INVENTION

FIG. 1 illustrates a block diagram of the inventive features of a powerline communications device that allows for precise synchronization of content rendering of multiple network rendering nodes.

Data 107 is received from the content distribution network 100, through the PHY 105, which is the "PHYsical layer" interface between the network 100 and the apparatus 200. A network may be, but is not limited to powerline communications, DSL, Wi-Fi, Cable and wired or wireless content distribution network. In this scenario, the data stream is an audio stream coming from a source apparatus over the network, and that all of the digital content packets are individually tagged with timing reference data, and at least one time flag is generated by the PHY 105, called the PHY timing flag and is derived from a Orthogonal Frequency Division Multiplexing (OFDM) synchronization signal. The PHY time flag is generated by the PHY and transmitted to the receiving node which detects and process it to crate PHY timing data This data represents delays in communications due to the PHY and channel delays. These delays are detected by the high speed PHY hardware, so that the PHY timing data does not contain additional delays that may be due to the layers above the PHY, or miss delays hidden from the other layers by the PHY. The PHY timing flat is appended to the transmitted packet just before the packet is transmitted and contains the time when the data was sent by the PHY.

When received, the data is detected, decoded and the embedded packet timing data (including the PHY timing flag, is extracted to create a timing signal 108. The PHY timing flags compared to the time the receiver decoded the signal in the receiver PHY. The difference is the PHY timing data and represents the time it took the message to leave the data link layer on the transmit side and enter that layer from the PHY on the receiver side. This difference is used to adjust the other timing information and global sync signals to precisely correct for transmission-to-receptions time delays and variations. This time flag is different from the various time timestamp methods that are included in the content data stream. The resulting accuracy is unique to this invention. The packet timing data can also contain historical information about how the transmitter time base or delays in the PHYs and channel drifts. The data 107 contains meta data such as sequence number, stream ID and other time stamps, flags and data, that are well known in the art such as taught by, for example, Kionetski (US 2006/0156375), Fujimoto (US 2006/0072399) and Ho (U.S. Pat. No. 7,668,243) and incorporated within by reference. The content data 107 is loaded into the receive Buffer 120. The timing information 108 is recorded in the look up table, and the location of the data 107, representing a time slice of the analog content (in digital form) in the buffer 120, are associated with each other in the table. This table provides the key flexibility to shift, group and manage the content data in response to the composite timing information and external timing data better than any "sync-signal-only" system can provide.

All of the resulting timing information is used the time lookup and compare table functional block 115 to generate a composite macro synchronization signal which is then used to tell the apparatus which time stamped data 107 in the Buffer 120 to render. Since all rendering devices in the network have access to the synchronization signal, all devices can optimize synchronized playback rendering.

In order to maintain synchronization between the rendering apparatus, it is sometimes necessary to adjust system parameters. For example, the bit depth of the buffer can be reduced and the rendering engine adjusted to use fewer bits. This allows the necessary data to arrive if the data rate is slowing down. In an embodiment, this invention is to allow the buffer to skip content data in order to catch up to the macro clock. In this case, time slices represented by groups of sequential data or packets of data are skipped. For example, MPEG data group 188 bytes at a time. It is important that the data be grouped in such a way that adding or removing it doesn't affect the rendering engine. Interpolation of the data, such as done in cellular codex devices, can also help minimize the noise that could result. It is also possible to add data to the rendering engine input so as to cause the rendered content to "march in place" until the synchronization clock catches up. If a slice of data is missing, it is also possible to interpolate the missing data from data before and after it, thereby minimizing the effect of the missing slice.

It is a further intention of some embodiments of this invention to be able to shift the time reference with respect to the macro reference by adding or subtracting a time offset. This is done by shifting the association between the look up table time stamps the data they point to in the buffer. This comes in handy when one playback apparatus is a speaker at the far end of a room and a constant offset is helpful to phase the speaker output to the user listening preference.

It is also an object of some embodiments of this invention to be able to use any external signal 109 to provide system-wide macro timing instead of or in addition to signal 108. GPS systems use atomic clocks to synchronize their ranging satellite network. The signal from anyone satellite may be used offset or adjusted by timing data, including the PHY time flag, to synchronize the rendering network. Modern cellular systems also use GPS to generate clock signals that are transmitted to the cell phones. Therefore the cellular network may also be a source of an external timing signal 109.

Since it is possible in this embodiment, to have a multi-network bridging device, it is useful to also be able to take the system-wide macro synchronization clock from one network and transpose it into the appropriate format for any other network to which it might connect. This allows apparatus receiving the same content stream on different networks to also stay synchronized. Each network's PHY may generate its own time tag and historical time drift data for the nodes on its network.

Although particular embodiments have been disclosed herein in detail, this has been done by way of example for purposes of illustration only, and is not intended to be limiting with respect to the scope of the appended claims, which follow. In particular, it is contemplated by the inventor that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventor reserves the right to pursue such inventions in later claims.

What is claimed is:

1. A system for synchronizing content playback, comprising:
   two or more content playback apparatus;
   one or more content sources connected by a network to the two or more content playback apparatus to provide content, the content provided by the one or more content sources being digital multimedia data including audio and video comprising content data, content timing data, and at least one physical layer (PHY) timing flag derived from an orthogonal frequency division multiplexing (OFDM);
   wherein the content playback apparatus contains one or more of a long data memory buffer and a look up table controlled by a rendering engine and an application program;
   wherein the content is rendered responsive to the content timing data, offset by timing data, used to compensate for delays in communication so that rendering of a content data stream is synchronized; and
   wherein the rendering engine is able to at least one of add and remove time slices of the content and adjust a speed of a local clock in order to maintain synchronization with a system-wide macro clock adjusted by timing information including the PHY timing flag or by a relative drift of the local clock as preserved in PHY historical information about how a transmitter time base drifts.

2. The system in claim 1 where all the content playback apparatus are connected to the same power distribution network and use powerline communications as a means of communications and content distribution.

3. The system in claim 1 where the content playback apparatus is able to buffer the content prior to the playback and a depth of such buffers is controlled by the application program and could be changed remotely through a network.

4. The system in claim 1 where the content timing data and PHY timing flags control and synchronize the rendering engines by offsetting the system-wide macro clock by a difference between the PHY timing flag and the time at which the PHY timing flag was received.

5. The system in claim 1 where the addition of the time slices is accomplished via replication of a previous slice.

6. The system in claim 1 where the addition of the time slices is accomplished via interpolation of previous and next slices.

7. The system in claim 1 where an additional time offset can be manually or remotely added to or subtracted from one or several of the playback apparatus.

8. The system in claim 1 where the content playback apparatus are connected to different powerline networks and network-to-network signaling is used to synchronize each network against a system-wide macro clock time base that is also appended by each network's own PHY timing data.

9. The system in claim 8 where an external network synchronizations time reference is used.

10. The system in claim 9 where the external network synchronizations time reference is a GPS signal.

11. The system in claim 9 where the external network synchronizations time reference is a cellular signal.

12. A system for synchronizing content playback, comprising:
   at least two content playback apparatus configured to receive content from at least one content source through a network, the content being digital multimedia data including audio and video with content data, content timing data, and at least one physical layer (PHY) timing flag derived from an orthogonal frequency division multiplexing (OFDM);
   wherein the content playback apparatus contains a long data memory buffer and a look up table controlled by a rendering engine and an application program;
   wherein the content is rendered responsive to the content timing data, offset by timing data, used to compensate for delays in communication so that rendering of a content data stream is synchronized; and
   wherein the rendering engine is able to add and remove time slices of the content in order to maintain synchronization with a system-wide macro clock, the system-wide macro clock adjusted by timing information including the PHY timing flag or by a relative drift of a local clock as preserved in PHY historical information about how a transmitter time base drifts.

13. The system of claim 12, wherein the rendering engine is able to adjust a speed of the local clock.

14. The system of claim 12, wherein the network is a power distribution network and the content playback apparatus utilize powerline communications to receive the content.

15. The system of claim 12, wherein the content playback apparatus are able to buffer the content prior to playback of the content.

16. The system of claim 15, wherein a depth of the buffer is controlled by the application program.

17. The system of claim 16, wherein the depth of the buffer is changed remotely.

18. The system of claim 12, wherein the content timing data and PHY timing flags control and synchronize the rendering engines by offsetting the system-wide macro clock by a difference between the PHY timing flag and the time at which the PHY timing flag was received.

19. The system of claim 12, wherein the addition of the time slices is accomplished by one of replication of a previous slice and interpolation of previous slice and next slices.

20. The system of claim 12, wherein an external network synchronizations time reference comprising a GPS signal is used.

* * * * *